US006307853B1

United States Patent
Storch et al.

(10) Patent No.: US 6,307,853 B1
(45) Date of Patent: *Oct. 23, 2001

(54) RE-ROUTING TELEPHONY COMMUNICATIONS TRAFFIC THROUGH A PRIVATE BRANCH EXCHANGE TO A DATA NETWORK

(75) Inventors: Randy S. Storch, Highland Park; Omprasad S. Nandyal, Bloomingdale, both of IL (US); Antonio Dutra, Buffalo, NY (US); Benjamin Kamen, Deerfield; Martin T. Wegner, Barrington, both of IL (US)

(73) Assignee: Net2Phone, Inc., Newark, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,830

(22) Filed: Sep. 25, 1997

Related U.S. Application Data

(60) Provisional application No. 60/031,447, filed on Nov. 21, 1996.

(51) Int. Cl.[7] ............................ H04L 12/56; H04L 12/66; H04M 15/00
(52) U.S. Cl. ..................... 370/354; 370/401; 379/112; 379/221
(58) Field of Search ................................ 370/352, 354, 370/355, 356, 252, 410, 522, 465, 477, 468, 351, 349, 256, 450, 242; 379/93.01, 114, 112, 93.24, 211, 265, 221, 201; 709/231

(56) References Cited

U.S. PATENT DOCUMENTS

| | | | | |
|---|---|---|---|---|
| 5,341,374 | * | 8/1994 | Lewen et al. | 370/450 |
| 5,369,686 | * | 11/1994 | Dutra et al. | 379/93.24 |
| 5,519,770 | * | 5/1996 | Stein | 379/201 |
| 5,521,910 | * | 5/1996 | Matthews | 370/256 |
| 5,673,299 | * | 9/1997 | Fuller et al. | 379/201 |
| 5,712,907 | * | 1/1998 | Wegner et al. | 379/112 |
| 5,726,984 | * | 3/1998 | Kubler et al. | 370/349 |
| 5,742,596 | * | 4/1998 | Baratz et al. | 370/356 |
| 5,751,706 | * | 5/1998 | Land et al. | 370/352 |
| 5,761,417 | * | 6/1998 | Henley et al. | 709/231 |
| 5,764,741 | * | 6/1998 | Barak | 379/114 |
| 5,926,535 | * | 7/1999 | Reynolds | 379/221 |
| 5,940,479 | * | 8/1999 | Guy et al. | 379/93.01 |

* cited by examiner

*Primary Examiner*—Ajit Patel
*Assistant Examiner*—John Pezzlo

(57) ABSTRACT

A telephony to data re-routing system (TDR) re-routes telephony communication over a wide-area network (WAN) or over a Public switched telephone network (PSTN). The TDR is coupled to a PBX which is configured to route telephony data to the TDR. The TDR processes the telephony data by converting it to a form that can be transmitted over the WAN. The TDR can also re-route the data back through the PBX for transmission over a PSTN. The TDR maintains the traditional telephony interface of dialing in response to a dial tone. Using the TDR, telephony users gain advantages offered by WAN data transmission including store-and-forward delivery, optimized bandwidth allocation, and secure data transmission without having to learn a new user interface. In addition, multiple call originator telephone devices can use a single TDR.

72 Claims, 8 Drawing Sheets

RE-ROUTING TELEPHONY COMMUNICATIONS TRAFFIC THROUGH A PRIVATE BRANCH EXCHANGE TO A DATA NETWORK

The present application claims priority based upon U.S. Provisional Application serial No. 60/031,447, "Re-routing Telephony Communications Traffic Through a Private Branch Exchange to a Data Network," filed Nov. 21, 1996.

BACKGROUND OF THE INVENTION

1. Field of the Invention

The present invention relates to routing telephony communications. More specifically, the present invention relates to re-routing telephony communications over a data network or over a public switched telephone network (PSTN).

2. Description of Related Art

Two classes of conventional systems have been designed to route typical telephony communications through data networks. The first class of conventional routing systems uses "re-dialers". Re-dialers re-route specific calls through a separate transmission path, e.g., a data network, using a real-time or store-and-forward transport mechanism. Typically, the re-dialers are placed between an originating telephony device (most typically a fax machine) and a public switched telephone network (PSTN) or private branch exchange (PBX).

A first class of conventional routing systems is shown schematically in FIG. 1. FIG. 1 illustrates a fax machine 101 connected to a re-dialer 102. The re-dialer is connected to a PSTN point of presence (POP) 201. The re-dialer 102 is also connected to a wide area network (WAN) POP 301. The PSTN POP 201 serves as a gateway to the PSTN 200. The WAN POP 301 serves as a gateway to the WAN 300. A fax machine 103 can receive a fax transmission from fax machine 101. It should be noted that, in the general sense, the fax machine 103 can transmit a fax as well as receive a fax. The fax machine 103 receives the fax from either a PSTN POP 202 (if the fax is transmitted over the PSTN 200) or a WAN POP 302 (if the fax is transmitted over the WAN 300). The PSTN POP 202 is similar in operation to PSTN POP 201. The WAN POP 302 is similar in operation to the WAN POP 301.

The re-dialer 102 can re-route any fax call through a data network rather than through a PSTN 200. As used herein a data network can be a private wide-area network, a shared wide-area network such as could be provided by a value-added network service provider, an intranet, the internet, or any combination of these. Such a data network is showing in FIG. 1 as WAN 300. Re-routing can be based on the phone number dialed or other telephony condition (e.g., receiver busy). If re-routed, a fax machine 101 communicates with a fax machine 103 through the data network rather than through the PSTN 200. The communication can be conducted in real-time or can be delayed, e.g., by store and forward delivery. However, this first class of conventional routing systems requires a re-dialer for each telephone device, which is a significant drawback.

The second class of conventional routing systems provides real-time voice communications from and to computer systems which have analog-to-data hardware and appropriate software. Though currently popular on the Internet, the second class of conventional routing systems can be implemented on any data network. The second class of conventional routing systems is shown schematically in FIG. 2. A workstation user 104 communicates with a workstation user 105 through the WAN 300. Recent modifications to the second class of conventional routing systems allow the receiver of the phone call, the user 105, to use a telephone rather than a computer workstation.

The primary drawback to the second class of conventional routing systems is that the call originator must change his or her telephony interface. In the case of voice calls, for example, the change requires that the call originator speak and listen through a computer system instead of through a telephone. A fairly straightforward modification of the second class of conventional routing systems is to have the call originator dial directly into a WAN POP 301 from a telephone. This modification also requires the user to dial one number for connection, identify himself or herself for authorization purposes, and then identify the receiver's address (i.e., workstation identifier or telephone number.) i.e., Thus, the modification requires the user to change the user's interface.

Neither class of conventional routing systems addresses the most typical implementation of business communications, which includes multiple call originators initiating (currently) telephony-based communications through a PBX. Any solution that requires independent devices for each call originator presents an installation, maintenance, and management challenge that is unrealistic for most organizations. Organizations cannot as easily cost justify a multiple device solution. Furthermore, system administrators have less control over the traffic generated by users who have the option of using or not using a re-routing device at their call origination site. A solution is needed that provides a single point of installation, maintenance and management. This centralized solution is more cost-effective, and lessens user control over routing decisions.

Moreover, any solution that requires a modification of an existing user interface presents a training and acceptance challenge. Users have shown time and again that a drastic change in their communication interface is unacceptable, regardless of the cost-savings that may be realized. For example, MCI was unable to compete successfully against AT&T for long distance telephone traffic when a user had to (a) dial an MCI access number, (b) authenticate himself or herself, and then (c) identify the called party's phone number. MCI was finally able to compete successfully only after their long distance services were allowed to be accessed in the same way that AT&T's long distance services were accessed, i.e., through direct 1+dialing. A solution that involves using a data network based transport instead of PSTN-based transport must similarly be implemented without modification to the user interface.

SUMMARY OF THE INVENTION

The present invention is directed to a system that overcomes the drawbacks of the aforementioned conventional routing systems. The present invention incorporates a telephony-to-data re-routing system (TDR), located behind a PBX to re-route calls. Because of the location of the TDR, all call originators share the same re-routing system, thereby overcoming the most serious drawback associated with the first class of conventional routing systems in which the re-dialers are located ahead of the PBX, i.e., the requirement for one rerouting device for each telephone device. Moreover, the TDR system does not require either party to the telephone call to change its existing method of telephony communications, thereby overcoming the most serious drawback of the second class of conventional routing systems wherein callers must modify their user interface.

In terms of costs, variable timed charges for use of the PSTN for long-distance connections are replaced with the typically lower, and in some cases non-variable, bandwidth usage or character count charges incurred on a data network. Further cost saving can be achieved in a real-time communications network, for example, by using compression, dynamic bandwidth allocation, and/or other bandwidth-saving means applied to the digital representation of the analog signal, converted for transmission over the data network. In a store-and-forward network, moreover, the TDR system, standard data network routing equipment, or both, can plan for the use of data network bandwidth more efficiently. For example, both can take advantage of the variable nature of other applications' bandwidth requirement gaps. Additionally, whether real-time or store-and-forward transmission is used, encryption and authentication of the communication content of the call can be applied from the call originator's PBX point of presence to the point of presence closest to the call receiver. This virtually end-to-end security represents a significant improvement over conventional routing systems. This is because conventional routing systems require security services with devices attached to or embedded in the originator's and receiver's telephone systems.

In the case of real-time voice phone calls, savings are a function of the bandwidth allocation (i.e., resource allocation) methods in place. As such, a PSTN provider with an underlying data network used for transport can accomplish the same savings as a private or semi-private WAN. However, the WAN owner can take advantage of his or her own usage characteristics rather than require the dedicated bandwidth that a PSTN operator needs to provide a publicly acceptable level of service. The PSTN operator must provide a continuous and immediate stream of signaling from the call originator to the call receiver. The communication link must be dedicated to the conversation between the call originator and the call receiver. As such, the PSTN reserves bandwidth even when there is no conversation taking place. The WAN operator can share bandwidth among multiple conversations. Depending on the WAN operator's knowledge of the nature of those conversations, the WAN operator may be able to predict moments of silence or minimal activity in any one conversation. Therefore, WAN user characteristics allow for the maintenance of multiple conversations whereby any one at any one time can be given more or less bandwidth depending on its needs.

More significantly, in the realm of real-time communications, applications such as fax and video transfer are not optimized for the existing PSTN network. This is because the conventional PSTN networks are specifically designed and optimized to provide voice transfer. For example, a PSTN allocates a 64 kb channel for a typical voice communication session, when most fax communication requires only a 9600 baud transfer rate. Thus, a WAN owner knowing that a particular long-distance communication is facsimile transfer, can allocate a lower bandwidth to the long-distance communication. Such allocation and resource conservation is not easily achieved, if achieved at all, using conventional transmission over a PSTN path.

When the intended recipient of the communication is not available, or for any other call originator- or WAN-determined reason for delaying the delivery of the communication, the potential for cost savings increases. The TDR system at the call originator's point of presence can intercept the communication for later delivery to the intended recipient. By doing so, WAN bandwidth and other resources can again be allocated efficiently.

Thus, one object of the present invention is to provide an efficient interface for re-routing telephone calls over a data network.

Another object of the present invention is to provide re-routing without requiring one re-dialer device per originator telephone device.

A further object of the present invention is to preserve the user interface for the typical telephone caller.

Another object of the present invention is to provide for optimized resource allocation and transmission of calls over a data network.

A further object of the present invention is to provide data network-based call services, including encryption and authentication, to telephone users.

Another object of the present invention is to apply data network-based compression and other resource conservation techniques to telephone call transmissions.

These and other objects of the present invention are described in greater detail in the following description of the invention, the appended drawings, and the attached claims.

DETAILED DESCRIPTION OF THE PREFERRED EMBODIMENT

Figure 1:
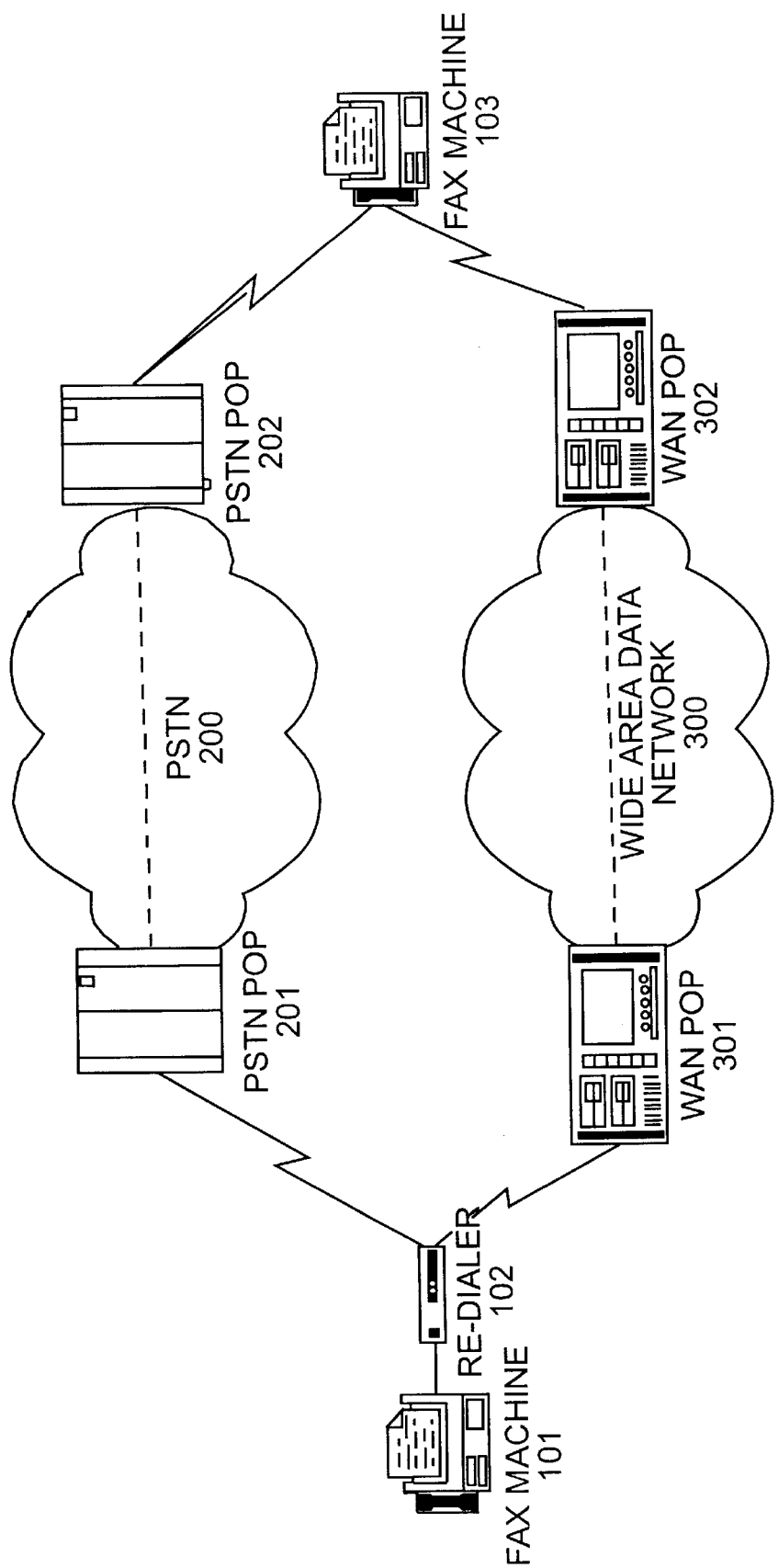
FIG. 1 is a schematic of a prior art system using one re-dialer per originator telephone device.
Figure 2:
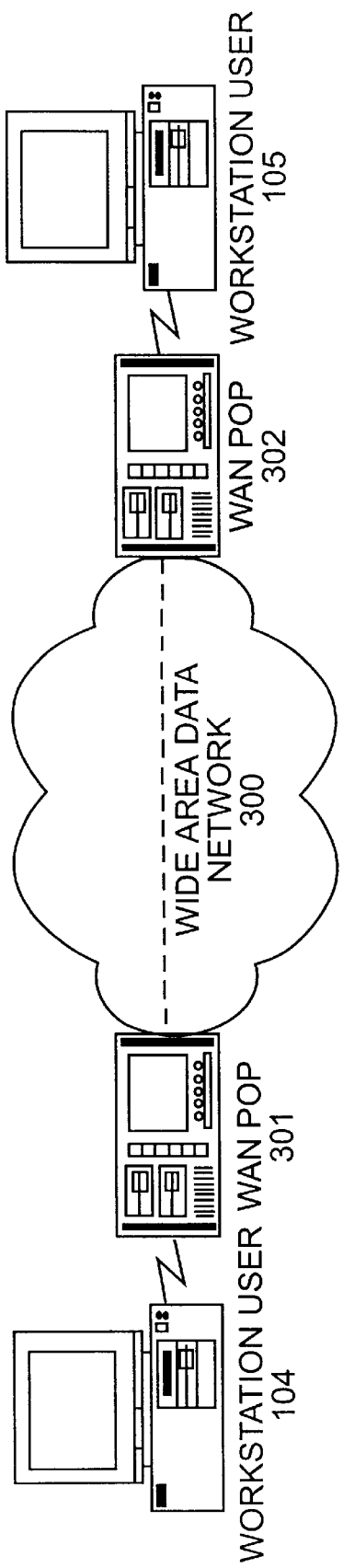
FIG. 2 is a schematic of a prior art system requiring a changed user interface.
Figure 3:
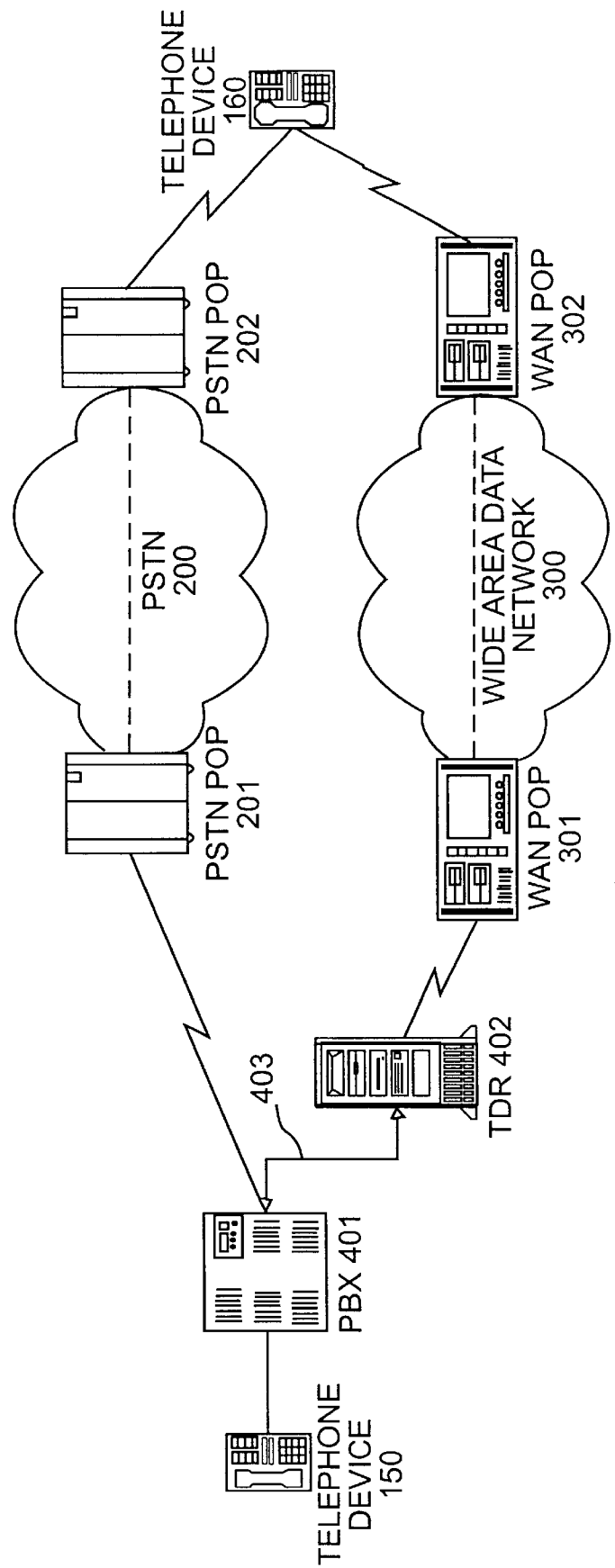
FIG. 3 is a schematic of a preferred embodiment of the present invention for a single originator telephone device.

FIG. 3 illustrates a preferred embodiment of the present invention. In this preferred embodiment, a telephone device 150 initiates and conducts a communications session with a similar telephone device 160. The telephone device 150 is also referred to herein as an originator telephone device 150. The telephone device 160 is also referred to herein as a receiver telephone device 160. Telephone devices 150 and 160 can be any telephone devices, including telephones, fax machines, and video workstations.

A PBX 401 provides normal telephony-bound connections for the communication session. In conventional re-routing systems, the PBX 401 routes a call originated by the telephone device 150 to a PSTN POP 201. The PSTN POP 201 is typically located at a phone company "Central Office" or C/O. A PSTN 200 then finds a PSTN POP 202 which provides a direct connection to the telephone device 160. When the PSTN 200 finds the appropriate PSTN POP 202, the communication session is established. Note that the present invention is not limited to PBX-based systems. Any telephone switching system can be used. For example, a Centrex system can be used in place of PBX 401. Thus, the switching system is not limited to be co-located on the customer premises.

In the preferred embodiment of the present invention, the PBX 401 is connected (logically or physically) to a telephony-to-data re-routing system (TDR) 402. The PBX 401 is programmed to route specific calls, or all calls generated by specific telephony devices, to the TDR 402 rather than to the PSTN POP 201.

It is desirable not to change the interface of the user of telephone device 150. Accordingly, the TDR 402 preferably responds to calls routed to it in the same manner as the PSTN POP 201, at least until such time as the connection through a WAN 300 can be established. So, for example, when using a PBX, users must typically enter an "escape digit" (e.g., dial "9" to get an outside line) to connect to the PSTN 200. At this point, the PSTN POP 201 provides dial-tone to the user, and additional digits are subsequently entered. In the present invention, when the user enters the escape digit, the TDR 402 provides a dial-tone to inform the user that he or she can enter additional digits.

In many cases, the PBX 401 can be configured to re-route calls based on the phone number entered, or based on a particular telephony condition. If not, as the additional digits are entered, TDR 402 can make this determination. For this reason, the communication link 403 between the PBX 401 and the TDR 402 is shown to have arrows pointing in both directions. When the TDR 402 determines that a particular phone call should be placed through the PSTN 200, it re-directs the call back through the PBX 401 to the PSTN POP 201 to provide this re-routing.

As described above, the present invention encompasses three distinct components: (a) re-configuration of the PBX 401 to route calls through the TDR 402 upon the PBX 401's determination that a call through the WAN 300 is preferable to routing through the PSTN 200, (b) performance characteristics allowing the TDR 402 to act as a conversion module between the telephony requirements of an originator telephone device 150 and the data requirements of the WAN POP 301, and (c) routing rules in the TDR 402 that allow it to act as a supplemental module to PSTN 200.

The foregoing disclosure describes a system directed to telephony call re-routing for a single call originator. The present invention also applies to environments where multiple telephone devices are connected to the PSTN 200 through a PBX 401. Such telephony devices include fax machines, telex devices, standard telephones, video conferencing equipment, or any other communication device relying on telephony for transport. Any number of users, using any combination of the above devices, can take advantage of the present invention to re-route calls through the WAN 300 instead of the PSTN 200.

For example, in a preferred embodiment of the present invention, the PBX 401 is configured such that calls from a plurality of fax machines at the site are routed through the same TDR 402 to the WAN 300. This eliminates the need to maintain multiple re-dialers 102 as required in conventional systems. Moreover, the present invention allows a system administrator to enable any telephony device to use the TDR 402. This is accomplished by configuring the PBX 401 to enable another telephony device to access the TDR 402. Further, the system administrator can configure the TDR 402 to implement the least cost routing algorithm to take advantage of any combination of a data network as described above.

Figure 4:
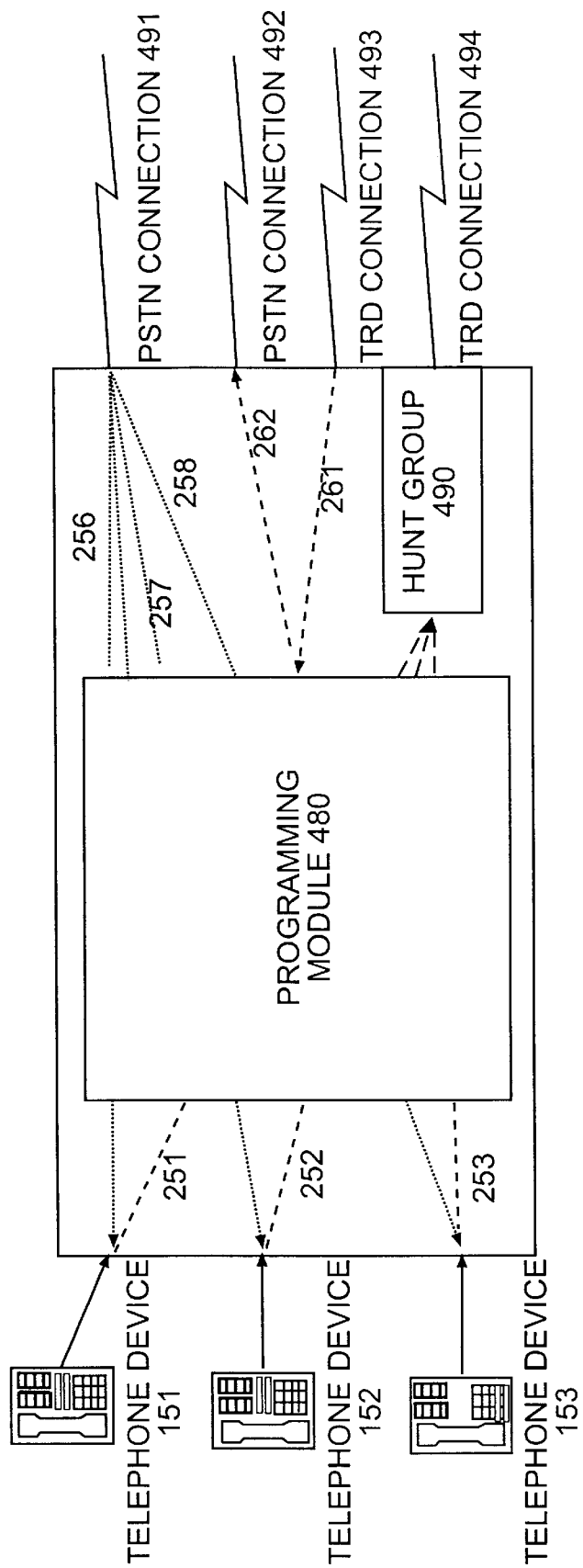
FIG. 4 is a schematic of a PBX that can be used with a preferred embodiment of the present invention with one or more originator telephone devices.

FIG. 4 illustrates a preferred configuration for a PBX 401 that can be used with the present invention. This configuration maintains the interface to telephone devices 151,152, and 153. In conventional systems, the telephone devices 151, 152, and 153 are coupled to a PSTN Connection 491 through a programming module 480. Thus, calls originated by users of these three devices are routed to the nearest PSTN POP 201 to establish a telephony connection to a similar remote telephone device. Typically, users of these devices press "9" on a telephone keypad, to signal the programming module 480 to create clear paths 256, 257, and 258, respectively, to the PSTN POP 201.

In a preferred embodiment of the present invention, the programming module 480 is configured to re-route calls through the WAN 300. In the preferred embodiment when a user presses the digit "9" on the telephone keypad of the telephone devices 151, 152, and 153, paths 251, 252, and 253, respectively, are made to hunt group 490. The hunt group 490 provides a surrogate path to the TDR 402, through a TDR connection 494. The hunt group 490 is a series of telephone lines organized in such a way that if the first line is busy, the next line is hunted, and so on until a free line is found. Hunt groups are well known in the art and need not be described further. This completes the first step for maintaining the same interface to the users of the telephone devices 151, 152, and 153. The second step for maintaining the user interface of the telephone devices 151,152, and 153 is described below with reference to FIG. 5.

Figure 4A:
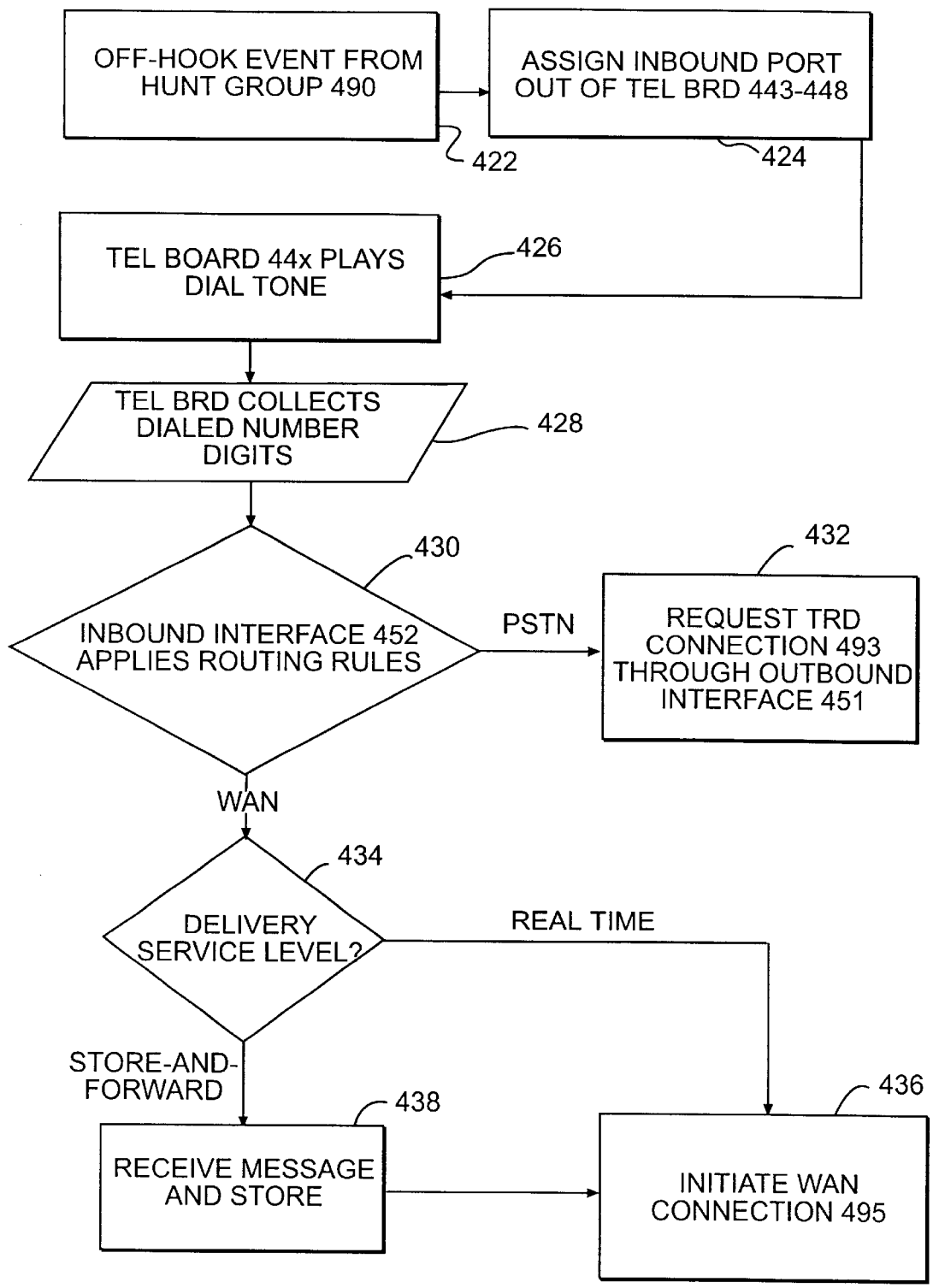
FIG. 4A is a flow chart representing the major decision points of a TDR according to a preferred embodiment of the present invention.

FIG. 4A is a flow chart representing the major decision points and processes of TDR 402 on handling routing for a telephone call. In step 422, the PBX 401 initiates an off-hook event through its Hunt Group 490, and a request is made for a TDR connection 494 into the TDR. TDR 402 then assigns the call to one of the inbound ports available on one of the telephone boards 443 through 448 in step 424. The assigned telephone board plays a dial tone in step 426, which triggers the call originator telephone device 151,142, or 143 to enter the digits of the call receiver's phone number. The dialed digits are collected by the assigned telephone board 443–448 in step 428. Routing rules, stored on the TDR 402, are applied in step 430. These rules may reflect varying criteria depending on the phone number dialed and the identity of the call originator telephone device (if known). There are two alternate decision paths that can result from the application of the routing rules. The first decision is to re-route the call back to the PSTN in step 432. In this case, TDR 402 invokes outbound interface 451, and a connection is made through TDR connection 493 back into the PBX 401. The second routing decision is to use the WAN for delivery. In this case, a second decision point is to determine whether the call should be made in real-time or in store-and-forward mode in step 434. This decision also rests on varying criteria depending on the identity of the call originator telephone device, and that associated user's desired default delivery mode, and/or, typically, an additional "escape code" entered as part of the phone number dialed (e.g., users are instructed to enter "#" preceding any number that should be delivered real-time). If real-time delivery mode is selected, an immediate WAN connection 495 is established in step 436. If not, the message is collected and stored by the inbound interface 442, and the connection to the call originator telephone device is dropped in step 438. Then, the message is delivered through WAN connection 495 in store-and-forward mode in step 436.

There are various configurations or implementations for the PBX 401. One configuration of the PBX allows the PBX to make an alternate routing decision, that is, route some calls toward the PSTN connection 491 and others toward the TDR connection 494—depending on the telephone number dialed. For example, local calls may be routed directly to the PSTN 200, while long distance calls are routed to the WAN 300. More sophisticated configurations of the PBX 401 allow the PBX 401 to attempt a call to the PSTN 200, determine that the call receiver's telephone device 160 is not available (e.g., busy or no answer telephony condition), and only then re-route the call over the WAN 300.

Regardless of the particular configuration or implementation of the PBX 401, paths 256, 257, and 258 are still maintained in the preferred embodiment of the present invention. There are two primary reasons to maintain these paths. First, call originators may desire to "bypass" WAN routing. That is, the call originator may know that a certain call will, by the rules of the programming module 480, be re-routed to the WAN 300, but have a desire that the call instead be routed to the PSTN 200. The programming module 480 can be configured so that pressing the digit "8", for example, routes a call directly toward PSTN connection 491 over paths 256, 257, and 258, thereby bypassing the WAN 300.

Figure 4B:
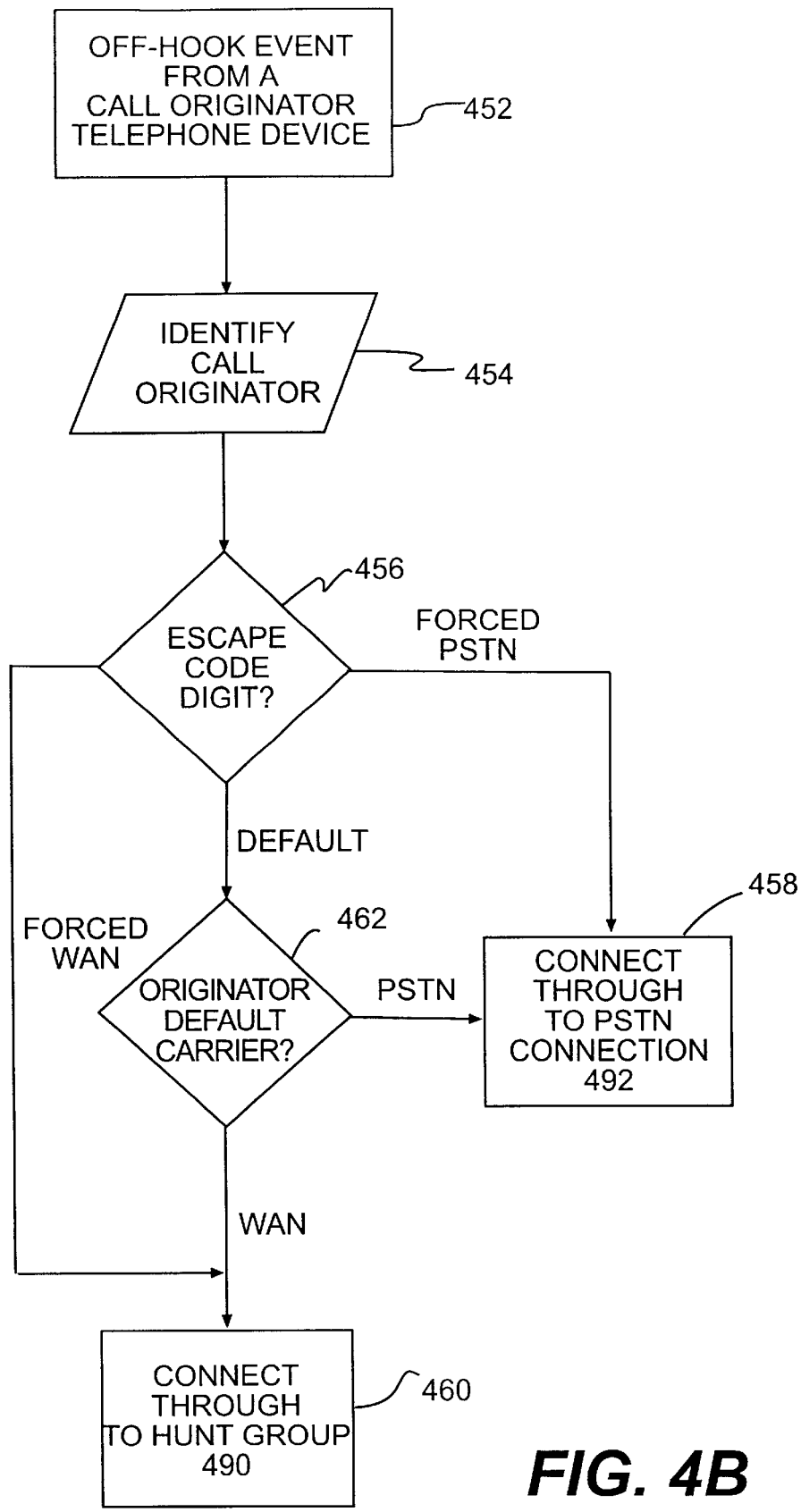
FIG. 4B is a flow chart representing the major decision points in a programming module.

FIG. 4B is a flow chart representing the major decision points and processes of programming module 480. In step 452, the user of call originator telephone device 151, 152, or 153 attempts to place a phone call, initiating the "off-hook event" recognized by the PBX 401. The PBX 401, in step 454, identifies the call originator and extracts the associated user detail information stored in the PBX 401's memory. In step 456, the PBX 401 assesses the escape code digit used to gain access to the PBX. If the escape code digit indicates a request for forced delivery through the PSTN 200 (e.g., using the "8" digit as noted above), then the PBX 401 routes the call to PSTN connection 492 in step 458. If the escape code digit indicates a request for forced delivery through the WAN 300 (e.g., using an alternative digit such as "7"), then the PBX 401 routes the call to Hunt Group 490 in step 460. If the escape code digit is the "default" digit (e.g., "9") for this particular call originator, then PBX 401 must re-route the call depending on the value, as provided in the user detail information, used "by default" for this call originator. The user default value for this call originator is determined in step 462. If the user default value is "PSTN" (i.e., entry of escape code digit "9" means connect via the PSTN 200 for this call originator), then the PBX 401 makes a connection to PSTN POP 201 through PSTN connection 492 in step 458. If the user default value is "WAN" (i.e., entry of escape code digit "9" means connect via the WAN 300 for this call originator), then the PBX 401 makes a connection to TDR connection 494 through Hunt Group 490 in step 460.

The second reason to maintain paths 256, 257 and 258 in the preferred embodiment is for call reception. Each telephone device 151, 152, and 153 remains available for incoming calls by maintaining the same paths from PSTN POP 201 to these devices that existed prior to the re-configuration of PBX 401. The present invention does not interfere with these incoming calls.

Finally, note an additional path through paths 261 and 262, whereby a TDR connection 493 connects back into PBX 401 over path 261 for routing to a PSTN connection 492 over the path 262. The additional path allows more sophisticated re-routing programming on the TDR 402 when the PBX 401 does not include all of the capabilities of the PBXs described above.

Path 261 can also be connected to any of the inbound paths 256, 257, or 258 for the completion of calls originated on another location of WAN 300, where telephone device 151, 152, or 153 is the intended call receiver. This is described in further detail below.

Figure 5:
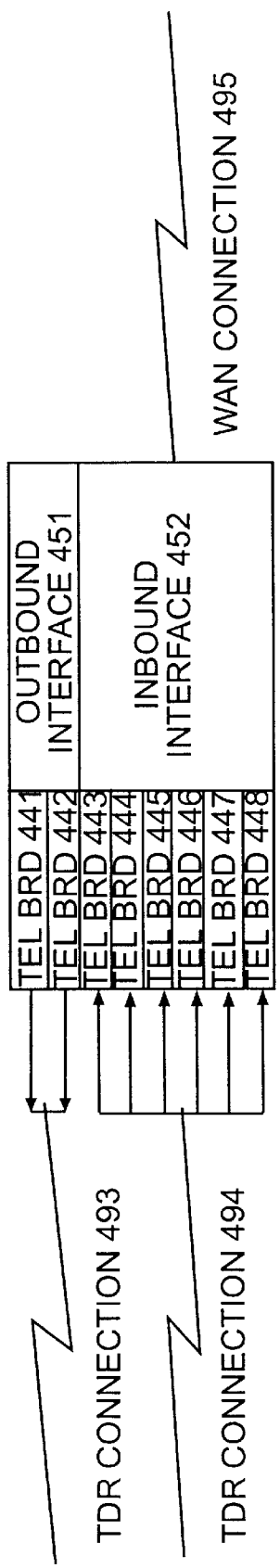
FIG. 5 is a schematic of a TDR according to a preferred embodiment of the present invention.

FIG. 5 shows a preferred implementation of the TDR 402. The TDR 402 can be a separate computer unit, such as a standard Intel-based computer or a UNIX-based system, with appropriate storage for maintaining routing rules and, in the case of store-and-forward communications, providing temporary storage of messages. Alternatively, the TDR 402 can be embedded in PC-based implementations of the PBX 401. Other configurations for the TDR 402 incorporating the concepts of the present invention are possible and would be within the skill of the those in the art.

The TDR connection 494 from the PBX 401 provides paths to telephone boards 443 through 448. The telephone boards 443 through 448, each having one or more usable ports, can be analog or digital telephony boards, such as those made by Dialogic and Dianatel, fax boards, such as those made by Brooktrout or GammaLink, or any other telephony or communications protocol equipment corresponding to the type of telephone device 151, 152, or 153 originating the call.

An important requirement of the TDR 402 equipment is that at least one of the boards be able to provide a dial-tone so that the call originators continue with digit entry (i.e., continue to dial the phone number or other address identifying the call receiver). This is the second step in maintaining a typical telephony interface for call originators.

An inbound interface 452 is a processor that either (a) determines that a real-time connection is called for; (b) determines that a store-and-forward message communication is called for; or (c) determines that the call should be re-routed back through the PBX 401 to the PSTN 200. The terms "inbound" and "outbound" are used in this section with respect to the TDR, not the message. Thus, when the TDR receives a request, it is "inbound" to the TDR; when it sends a response or makes a request, it is "outbound" from the TDR. If this inbound interface 452 determines that a real-time connection is required, the inbound interface 452 enables a direct path to the WAN 300 through a WAN Connection 495. If the inbound interface 452 determines that a store-and-forward message communication is required, the inbound interface 452 serves as the end-point for message delivery from telephone devices 151, 152, and 153. If the inbound interface 452 determines that a call should be re-routed back through the PBX 401 to the PSTN 200, the inbound interface 452 routes the call back through an outbound interface 451, and through a telephone board 441 or 442, to the TDR connection 493.

Whether in the real-time mode or the store-and-forward mode, the inbound interface 452 can use a priori knowledge about the particular originator telephone device initiating a call to provide for optimal use of the WAN 300. For example, if the originator telephone device 151 is known to be a fax machine, its maximum communication speed will be 14,400 bits per second. Even without considering compression possibilities, the inbound interface 452 can request bandwidth services having sufficient capacity to process data at that data rate. This bandwidth requirement is smaller than a comparable fax call over the PSTN 200, where a bandwidth of 64,000 bits per second is allocated for any analog call originated by any telephone device, including fax machines. Other bandwidth optimization methods are possible at this point as well. In fax transmissions, for example, the communication bandwidth requirements between page transmissions are generally lower than the communication bandwidth requirements for transmitting scanned lines representative of the pages themselves. The inbound interface 452 can request a dynamic allocation of bandwidth over the WAN 300 that changes depending on what component of the data content is being transmitted.

The inbound interface 452 can also include communication content handling, in a real-time or a store-and-forward mode. Communication content handling functions provide additional value to the call originators and receivers. Communication content handling functions are alternately referred to as value-added services. The digitization of the communication content (voice, fax, e-mail message, etc.) allows for two services optimized for data networks. The two services are compression and security services. Compression represents the content of the communication in the smallest number of bytes without loss of the meaning intended (or with minimal loss, such as with some voice compression techniques). Security services are typically separated into encryption and authentication components. Encryption renders the digitization in a format that cannot be interpreted by an unauthorized intermediary intercepting the communication. Authentication unequivocally identifies that the call originator is a specific individual, and no other.

In the preferred embodiment of the present invention, the content handling features can be applied at a centralized point in the communications flow, rather than in the telephone device itself. Centralized application of the content handling features provides a significant advantage to both the call participants and the PBX administrator. The call participants are not burdened by additional equipment connected to their telephone devices (if not embedded in the device itself), nor by the requirement to maintain their own private information for security services (i.e., "keys" for the control of encryption and authentication).

For example, the centralized encryption services allowed by the present invention allow a PBX administrator to control key management, and any updates required to provide compression or security services. The TDR 402 provides one centralized point in the system where such encryption services can be offered. As described above, therefore, the present invention removes the need for providing such services at the location of each telephone device 151, 152, and 153.

The preferred embodiment of the present invention also allows for incoming calls through the WAN 300 to the telephone devices 151, 152, and 153 through the path available through the outbound interface 451. This feature of the preferred embodiment is provided via a telephone board 441 or 442, and the TDR connection 493.

The WAN Connection 495 is implemented through typical local or wide-area network connection equipment. In the preferred embodiment such equipment includes an ethernet network interface card in the TDR 402 and an external router.

On the receiving side of the WAN 300, a conversion is made by a device capable of converting the digital communication so as to provide a point-to-point connection between the call originator telephone device and a receiver telephone device 160. The receiver telephone device 160 is similar in type (e.g., telephone, fax machine, etc.) to the call originator's telephone device. The other device can be a PBX equipped with a TDR similar to TDR 402 to accept incoming calls from the WAN 300.

In some cases, a telephone device 160 is not available for call reception. For example, the telephone device 160 can be busy or does not answer. In this case, the TDR 402 can serve as a surrogate call receiver. In a preferred embodiment, the TDR 402 can serve as a voice message forwarding service for the call originator for an intended telephone conversation. Moreover, the TDR 402 can serve as a voice mail service for the call receiver.

The TDR 402 can also perform store-and-forward functionality under explicit instruction from the call originator or the call receiver, or both. That is, the call originator can originate the call with the desire that the TDR 402 will store-and-forward the message. One reason a call originator may desire such storing and forwarding of messages is to benefit from a lower cost for transmittal of the message at a later time. Also, the call receiver can configure the TDR 402 to act as its message receipt intermediary for all calls, such as with e-mail messages.

The flexibility offered by the store-and-forward functionality of the present invention can be expanded by combining it with the content handling capabilities described above. The combination allows the TDR 402 to commission store-and-forward functionality for a specific communication or for all communication meeting one or more criteria. For example, the TDR 402 can be instructed to send all messages to a particular user at a particular time. In a preferred embodiment of the present invention, the call originating telephone devices 151, 152, and/or 153 send instructions to the TDR 402. In an alternate preferred embodiment, a system operator sends instructions to the TDR 402.

In addition, a receiver telephone device, e.g., fax 103, can commission intermediary services from the TDR 402. For example, the receiver telephone device can instruct the TDR 402 to store all calls destined for the receiver device for handling at a later time.

The store-and-forward functionality of the present invention applies to both video data as well as voice data. Thus, video data can be streamed for real-time transmission, or staged for transmission at a later time.

Figure 6:
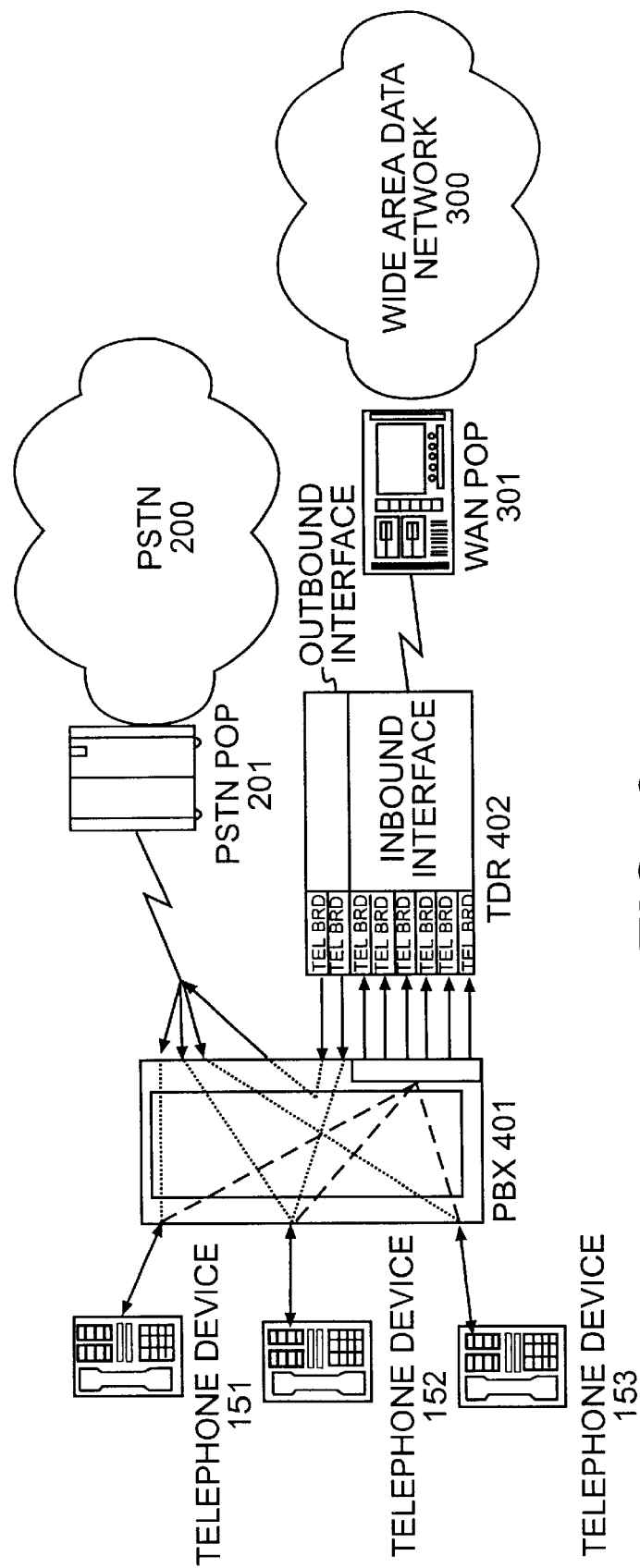
FIG. 6 is a schematic of a preferred embodiment of the present invention for one or more originator telephone devices.

FIG. 6 illustrates a preferred embodiment of a complete system which incorporates a preferred embodiment of the present invention at the point of origination. As described above, the telephone devices 151, 152, and 153 are positioned in the same relationship to PBX 401 as in conventional systems. The PBX 401 has, though, been re-configured, as described above, to route call origination to the TDR 402 instead of to the PSTN 201 POP.

The TDR 402 thus acts as a conversion device, taking telephone-based call origination and providing data network-based call traffic to call receivers. The TDR 402 can alternatively re-route calls through the PSTN POP 201.

FIG. 6 also identifies an additional task that can be carried out by the present invention. This additional task is the identification of the call originator, to properly track system usage. In the worst case, that is, where no additional identification of the call originator is passed to the TDR 402, the PBX 401 must keep track of each call origination separately. In this case, a later correlation of time stamps on the PBX 401 and the TDR 402 can be used to connect call origination (the device or user originating the call) to call details kept by the TDR 402. It is therefore important that either (a) the two modules be provided within the same physical device; (b) the two separate physical devices representing the two modules are synchronized; or (c) the subsequent correlation procedure synchronize the call origination by a consistent offset in timing between the two devices.

In the best case, there is enough information in the communications protocol invoked by the call originator's telephone device 151,152, or 153, such that the call originator can be identified. For example, in fax transmissions, the call originating fax machine identifies itself with a terminal station identifier (TSI). In this case at least one telephone board 443–448 should be capable of fax communications, and of recording or at least forwarding the TSI value to the TDR 402. This assumes that each of the telephone devices 151, 152, and 153 has unique TSI values set. If they do not, they can either be re-programmed so as to make them unique, or the correlation procedure can be used to identify the proper call originator where the TSI duplication makes this identification ambiguous.

Long distance charges are assessed to the call originator after the call originator has been determined as described above. Charges for the use of the PSTN 200 are generally variable and time based. That is, the PSTN 200 charges can change over time and are usually assessed for the time of use. The WAN 300 charges are generally assessed either on a per character transmitted basis, or on a bandwidth required basis.

The foregoing disclosure of embodiments of the present invention has been presented for the purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for efficiently routing telephony data over a public-switched telephone network, comprising:

(a) a telephony switching system to route telephony data originating from one or more originator telephone devices to one or more receiving telephone devices;

(b) a telephony-to-data re-routing system (TDR), coupled to said telephony switching system to which the telephony data is routed by the telephone switching system, and which determines whether to send the telephony data to any of the one or more receiver telephone devices in analog or digital form, and converts the telephony data to be sent in digital form to a particular receiving telephone device to digital data and re-routes the telephony data to be sent in analog form through the telephony switching system to the PSTN; and (c) a computer network to which the TDR is coupled, for distributing said digital data to said one or more receiver telephone devices.

2. The system of claim 1, further comprising means for determining long-distance connection charges based on when digital data is distributed across said computer network and variable, timed charges for use of said PSTN.

3. The system of claim 1, further comprising a compression means for compressing said digital data prior to distribution over said computer network.

4. The system of claim 1, further comprising a dynamic bandwidth allocation means for requesting bandwidth on said computer network in accordance with a bandwidth requirement of said digital data.

5. The system of claim 1, further comprising means for optimizing network usage based on a type of communication to be transmitted.

6. The system of claim 5, wherein the communication is from a fax machine or video device at the call originator's telephone device.

7. The system of claim 1, further comprising security services applied to the communication content passing between the call originator and call receiver.

8. The system of claim 7, wherein said security services comprise encryption.

9. The system of claim 7, wherein said security services comprise authentication.

10. The system of claim 1, further comprising means for detecting that a receiver telephone device is not available, and wherein said TDR acts as a surrogate receiving device.

11. The system of claim 1, wherein said one or more call originator telephone devices use said TDR as a store-and-forward device for a specific communication.

12. The system of claim 1, wherein said one or more call originator telephone devices use said TDR as a store-and-forward device for all communications matching a particular criterion or multiple criteria.

13. The system of claim 1, wherein said one or more call originator telephone devices use said TDR as a store-and-forward device for all communications intended for that receiver.

14. The system of claim 1, wherein said one or more call receiver telephone devices use the TDR as a store-and-forward device for all communications matching a particular criterion or multiple criteria.

15. The system of claim 3, wherein said compressing means compresses on the basis of a type of communication.

16. The system of claim 15, wherein said type of communication content comprises one of voice, fax, and video.

17. The system of claim 4, wherein said dynamic bandwidth allocation means allocated bandwidth on the basis of a type of communication.

18. The system of claim 17, wherein said type of communication content comprises one of a voice, fax, and video.

19. The system of claim 1, further comprising means for optimizing network usage based on a knowledge of the delivery requirements on the type of communication content represented in said digital data.

20. The system of claim 19, wherein said telephony data comprises video data that is to be streamed.

21. The system of claim 19, wherein said telephony data comprises video data that is to be staged.

22. The system of claim 1, further comprising a second TDR coupled to said computer network and to one or more receiver telephone devices to convert said digital data to analog data to be used by said one or more receiver telephone devices.

23. A system for routing telephony data, comprising:

a telephone switching device;

an originator telephony device coupled to the telephone switching device to generate the telephony data;

a receiver telephony device to receive the telephony data;

a PSTN to transmit the telephony data from said originator telephony device to said receiver telephony device in digital form;

a computer network to transmit the telephony data from said originator telephony device to said receiver telephony device in digital form; and a telephony-to-data re-routing system (TDR) to accept the telephony data from said telephone switching device, and route the telephony data over said PSTN or said computer network, wherein the telephony data to be routed over said PSTN is re-routed through the telephone switching device.

24. The system of claim 23, wherein said TDR comprises a programming module to make routing determinations.

25. The system of claim 24, wherein said programming module comprises routing rules according to which routing determinations are made.

26. The system of claim 24, wherein said programming module comprises:

means for determining a bandwidth required for transmission of the telephony data; and means requesting transmission resources sufficient to transmit the telephony data from said computer in accordance with the bandwidth required.

27. The system of claim 24, wherein said programming module further comprises security services to secure transmission of the telephony data.

28. The system of claim 27, wherein said security services comprise encryption.

29. The system of claim 27, wherein said security services comprise authentication.

30. The system of claim 23, wherein said TDR comprises an interface to generate a dial tone.

31. A method for routing telephone calls in a system having an originator telephone device, a receiver telephone device, a public switched telephone network (PSTN), a telephony-to-data re-routing system (TDR), a Private branch exchange (PBX), and a data network, comprising the steps of:
 a) routing a telephone call originated at the originator telephone device to the TDR through the PBX;
 b) determining whether to route said telephone call over the PSTN or the data network; and
 c) routing said telephone call over the PSTN or data network in accordance with step (b), wherein the telephone call is re-routed from the TDR to the PBX if it is to be routed over the PSTN.

32. The method of claim 31, further comprising the steps of:
 a) configuring the PBX to accept the telephone call from the originator telephone device, and to route said call to said TDR; and
 b) routing the telephone call back through the PBX to the PSTN if step (b) indicates routing through said PSTN is required.

33. The method of claim 31, further comprising the step of converting the telephone call to digital data if step (c) indicated routing through said data network is required.

34. The method of claim 33, further comprising the step of encrypting said digital data prior to routing through said data network.

35. The method of claim 33, further comprising further comprising the step of authenticating said digital data.

36. The method of claim 33, further comprising the step of optimizing said digital data for routing through said data network.

37. The method of claim 36, wherein said optimizing step comprises the step of compressing said digital data.

38. The method of claim 36, wherein said optimizing step comprises the steps of:
 determining information about said message; and
 requesting data network resources for routing based on said information.

39. The method of claim 38, wherein said determining information step further comprises the step of determining a telephony device type.

40. The method of claim 31, further comprising the step of providing a dial tone to a user upon routing said telephone call to the TDR.

41. The method of claim 31, further comprising the step of identifying a call originator to track system usage.

42. A telephony-to-data re-router, comprising:
 a telephony data interface to receive telephony data from a telephony switching device;
 means for determining whether the telephony data should be transmitted in analog or digital form;
 means for converting the telephony data to digital data if it is determined that that data should be transmitted in digital form;
 means for re-routing the digital data over a computer network; and
 means for sending the telephony data back to the switching device if it is determined that the telephony data should be routed in analog form.

43. The telephony-to-data re-router recited in claim 42, further comprising:
 means for determining whether the telephony data should be routed in real-time or should be converted to digital data and stored for routing at a later time.

44. The telephony-to-data re-router recited in claim 42, further comprising:
 means for acting as a surrogate telephony receiving device.

45. The telephony-to-data re-router recited in claim 44, wherein said means for acting as a surrogate receiving device comprises means for playing a dial tone to a caller so that the caller knows to enter additional digits to complete a telephone call.

46. The telephony-to-data re-router recited in claim 42, further comprising:
 means for determining a bandwidth required to deliver a particular message;
 means for requesting the determined bandwidth from the computer network; and
 means for delivering the message over the computer network using the determined bandwidth.

47. The telephony-to-data re-router recited in claim 42, further comprising means for secure sending of messages.

48. The telephony-to-data re-router recited in claim 47, wherein said means for secure sending of message comprises means for encrypting messages.

49. The telephony-to-data re-router recited in claim 47, wherein said mean for secure sending of messages comprises means for authenticating a sender of the messages.

50. A method for routing telephony data over a public-switched telephone network or a computer network, comprising the steps of:
 (a) receiving the telephony data from a telephone switching system;
 (b) determining whether to route the telephony data over the public-switched telephone network or the computer network;
 (c) converting the telephony data to digital data if it is to be routed over the compute network;
 (d) routing the digital data over the computer network; and
 (e) re-routing the telephony data through the telephone switching system for transmission over the public-switched telephone network if it is not converted to digital data.

51. The method recited in claim 50, further comprising the step of routing the telephony data through a public branch exchange to a telephony-to-data re-router.

52. The method recited in claim 50, further comprising the step of compressing the digital data.

53. The method recited in claim 50, further comprising the step of encrypting the digital data.

54. The method recited in claim 50, further comprising the step of authenticating an originator of the digital data.

55. The method recited in claim 50, wherein the determining step comprises the step of determining the route based on the content of the digital data.

56. The method recited in claim 50, further comprising the steps of:

(f) determining a bandwidth required to transmit the digital data over the computer network: and (g) dynamically allocating the required bandwidth to transmits the digital data.

57. The method recited in claim 56, further comprising the steps of:

(h) determining a type of the digital data; and (i) dynamically allocating bandwidth in accordance with the type.

58. A system for routing telephony data, comprising:

an originator telephony device to generate the telephony data;

a telephony switching system that receives the telephony data from the originator telephony device;

a telephony-to-data re-routing system (TDR) that receives the telephony data from the telephony switching system and converts the telephony data to a digital representation of the telephony data if the telephony data is to be transmitted digitally, and re-routes the telephony data to the telephony switching system if the telephony data is to be transmitted as analog telephony data; and a computer network coupled to the TDR over which the TDR transmits a digital representation of the telephony data.

59. The system recited in claim 58, wherein the telephony switching system determines whether the telephony data is to be transmitted digitally or as analog telephony data.

60. The system recited in claim 58, wherein the TDR determines whether the telephony data is to be transmitted digitally or as analog telephony data.

61. The system recited in claim 58, wherein the TDR encrypts the digital data prior to transmitting it over the computer network.

62. The system recited in claim 58, wherein the TDR compresses the digital data prior to transmitting it over the computer network.

63. A device to reduce the expense of making telephone calls, comprising:

means for receiving a telephone call from a telephone switching system;

means for determining whether to send the telephone call in digital form over a computer network or over a public-switched telephone network (PSTN) in analog form;

means for converting the telephone call to digital data if it is to be sent over the computer network;

means for sending the digital data over the computer network; and means for re-routing the telephone call to the telephone switching system if the telephone call is to be sent over the PSTN.

64. The device recited in claim 63, further comprising means for encrypting the digital data.

65. The device recited in claim 63, further comprising means for compressing the digital data.

66. The device recited in claim 64, further comprising means for determining whether to send the telephone call in digital form or analog form on the basis of information pertaining to a receiving telephone device that will receive the telephone call.

67. The device recited in claim 64, wherein the telephone switching system is a private branch exchange.

68. The device recited in claim 64, wherein the telephone switching system is a centrex.

69. A method for reducing the expense of making telephone calls, comprising the steps of:

receiving a telephone call from a telephone switching system;

determining whether to send the telephone call in digital form over a computer network or over a public-switched telephone network (PSTN) in analog form;

converting the telephone call to digital data if it is to be sent over the computer network;

transmitting the telephone call to digital data if the telephone call is to be sent over the computer network; and re-routing the telephone call to the private branch exchange if the telephone call is to be sent over the PSTN.

70. The method recited in claim 69, further comprising the step of encrypting the digital data.

71. The method recited in claim 69, further comprising the step of compressing the digital data.

72. The method recited in claim 69, further comprising the step of determining whether to send the telephone call in digital form or analog form on the basis of information pertaining to a receiving telephone device that will receive the telephone call.

\* \* \* \* \*